Jan. 14, 1964     D. T. LANG     3,117,447
THERMAL SENSING BY OSMOSIS
Filed Dec. 1, 1960
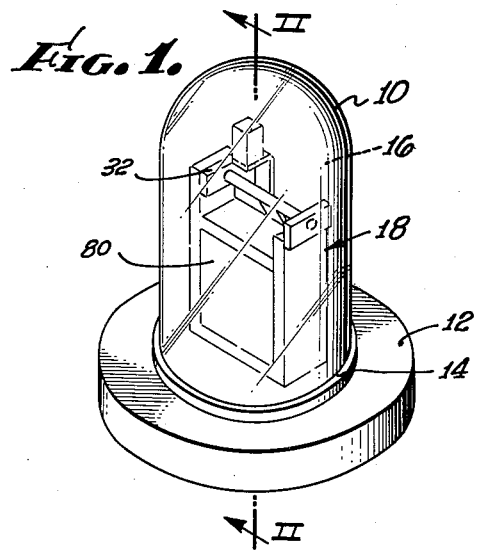
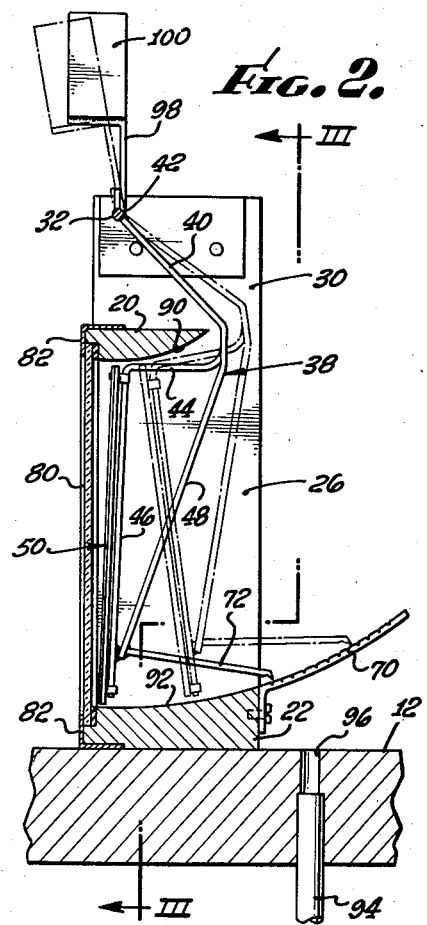
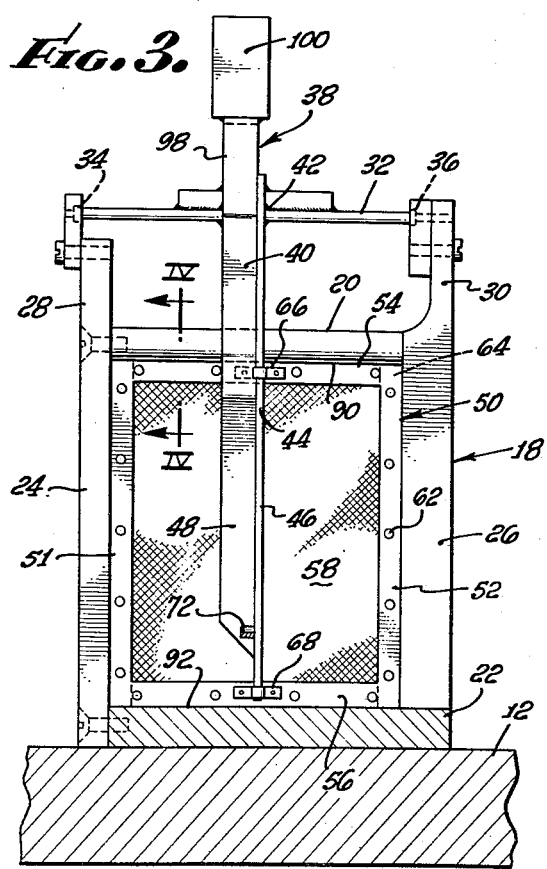
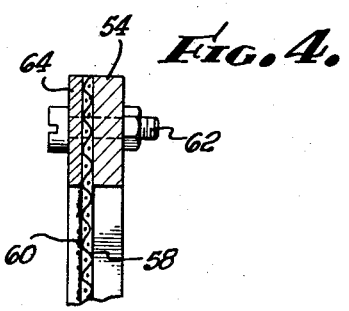
INVENTOR.
DELMER T. LANG
BY
Miketta and Glenny
ATTORNEYS.

United States Patent Office 3,117,447
Patented Jan. 14, 1964

3,117,447
THERMAL SENSING BY OSMOSIS
Delmer Thied Lang, 3717 Via Palomino,
Palos Verdes Estates, Calif.
Filed Dec. 1, 1960, Ser. No. 73,097
9 Claims. (Cl. 73—355)

This invention relates generally to detection and measurement of heat and other electromagnetic radiation and more particularly is directed to a thermal sensing device operating by osmosis or diffusion.

A simple radiometer converts incident electromagnetic radiation into thrust, but on so minuscule a scale as to be virtually useless for all but a very few practical applications. The present invention provides a device developing thrust having magnitudes of the order of thousands of times those of a radiometer.

In accordance with a preferred form of the invention hereinafter described and illustrated in detail, there is provided a hollow hermetically sealed chamber having at least a portion of its wall transparent to radiation to be detected or measured. Within the chamber is mounted a hollow frame defining a vertically oriented opening of desired shape, exemplarily rectangular. A flat target element is pivotally suspended within the frame opening, the target being of such size and shape as to substantially fill the opening, leaving only a small peripheral clearance between the outer edge of the target and the inner surface of the frame defining the opening. In its normal or rest position, the target may typically be vertical and is so disposed that radiation entering the chamber impinges the target face at a substantial angle of incidence, preferably virtually normal to the plane of the target.

The target is of mesh construction, and its face exposed to incident radiation is blackened by suitable means as by being subjected to a deposit of camphor smoke. The opening of the frame is desirably completely and hermetically closed on the sensing side of the target as by a sheet of glass or other material transparent to incident radiation spaced slightly from the rest position of the target.

Incidence of radiation causes the target to swing away from the radiation source, and the thrust thus developed can be easily calculated on the basis of a measured amount of displacement under various conditions.

Operation and testing of apparatus embodying the present invention has shown that among the major factors affecting the amount of thrust resulting from a constant magnitude of incident radiation are the fineness of mesh of the target, the amount of peripheral clearance between the target and the frame opening, the kind of gas in the chamber and its pressure, and the degree to which the exposed face of the mesh target is blackened as by smoke. In general the thrust is increased by a greater fineness of mesh of target material, by decreasing the peripheral clearance around the target, by the use of certain gases, particularly helium, by a more dense, but not compacted, application of smoke to the target and by a decrease of ambient pressure, although the factor last named has a complex effect upon the thrust, as will be seen.

It will be understood that the movement of the vane or target of the present invention in response to incident electromagnetic radiation may be made to do any operation within its thrust capabilities. Thus, for example, for use in the indication or measurement fields the target may carry or otherwise move a pointer or similar indicator along a scale; or a mirror for reflecting a light beam along a scale may be actuated by target movement; or an electric switch may be made or broken by such movement; or a portion of the target may constitute the movable plate of a variable capacitor incorporated in a circuit for controllably adjusting capacitance in response to input radiation.

Accordingly, a principal object of the present invention is to provide a novel device for temperature sensing by osmosis. More specifically, an object is to disclose a device for sensing of electromagnetic radiation by means of a movable vane or target suspended for pivotal movement within an opening in a frame, there being a very small peripheral clearance between target and frame; to provide such a device wherein the target is of mesh construction; to provide such a device having a target blackened as by smoke; to provide such a device operated in helium gas; and generally to disclose an electromagnetic radiation device of exceptional simplicity and economy of construction, yet capable of yielding target movement and thrust of the order of thousands of times greater than known devices of some similarity such as the conventional radiometer. These and other purposes and advantages of the invention will be understood from a study of the following description of an exemplary preferred embodiment of the invention taken in connection with the accompanying drawings in which:

FIG. 1 is a general view of a device including the invention.

FIG. 2 is a detailed sectional view on an enlarged scale taken on line II—II of FIG. 1, with the target shown in solid lines in rest position and in dotted outline in indicating or sensing position in response to electromagnetic radiation impinging thereon from the left as viewed in FIG. 2.

FIG. 3 is a rear view of the device taken along the arrows III—III of FIG. 2.

FIG. 4 is a fragmentary view on an enlarged scale taken on line IV—IV of FIG. 3 to illustrate smoke particles carried on the front surface of screen 38.

Referring now in detail to the drawings, there is indicated generally at 10 in FIG. 1 a bell jar or the like resting upon a base plate 12 and hermetically sealed to the latter along the lower edge 14. Within the chamber 16 thus formed there is indicated generally at 18 an upstanding frame mounted on the base 12. The frame includes upper and lower horizontal members 20 and 22 and side members 24 and 26 defining a generally rectangular opening, and the side members include upwardly projecting arms 28 and 30 respectively in which a shaft 32 is rotatably journaled, preferably by small anti-friction bearings 34 and 36.

A target support framework or spider indicated generally at 38 includes an upwardly and forwardly inclined member 40 which is fixed at 42 to the shaft 32. From the lower end of member 40 spider element 44 extends forwardly and then continues downwardly in forward portion 46 and an angular brace 48 serves to hold the spider rigid.

The target framework is indicated generally at 50 and in the present illustrative embodiment of the invention includes side members 51 and 52 joined by upper and lower transverse members 54 and 56 respectively. The target proper is indicated generally at 58 and constitutes a flat portion of porous or foraminous material such as fine mesh screen or the like blackened on its front surface as by particles of camphor smoke 60. Marginal portions of the screen are held in assembled relation with the target framework 50 by suitable fastening means 62 and retaining strips 64. Upper and lower target frame members 56 and 58 are connected to forward portion 46 of the spider 38 as by means 66 and 68 respectively and the target is thus suspended for pivotal swinging movement within frame 18 about the axis of shaft 32. Indicating means may be provided to measure the amount of such swinging movement and such means are here shown as including a graduated scale 70 fixed to frame member 22 and extending arcuately rearwardly therefrom and indicating pointer 72 carried by the spider 38 and movable along the scale.

In the operation of the present invention it is desirable that the space immediately adjacent the smoke covered screen 58 be generally closed in order to increase the sensitivity of the instrument. Thus there is provided a cover member 80 closing the front of the frame and held in place by retaining members 82, the cover being glass or other suitable material transparent to radiation to be measured. Similarly, the peripheral clearance between the target framework 50 and frame 18 should be as small as practicable and also should desirably remain substantially constant throughout the swing of the target. To that end the internal surfaces of frame members 20 and 22 are contoured convexly at 90 and concavely at 92 respectively, along arcs corresponding to the respective radii about the axis of shaft 32.

The gas within bell jar 10 may be controlled as to kind and pressure through conduit 94 connected with port 96 in the base plate.

Because of the offset construction of the target support spider 38 it may be desirable to provide counterweight means in order to maintain the target screen in substantially vertical orientation under rest or zero deflection conditions. Such means here include a vertical member 98 fixed to the spider member 40 and projecting upwardly therefrom and a mass 100 carried by the member 98 and disposed generally forwardly of the axis of shaft 32.

In operation of the present invention it is believed that electromagnetic radiation impinging the smoke-blackened targets heats such surface above the temperature of the opposite surface and that molecules of the gas present are thus caused to move through the screen and smoke layer from the cooler side to the warmer side. This manifestation of thermal molecular pressure or thermal transpiration is consistent with the explanation of the phenomenon in the literature, for example at page 35 of Kinetic Theory of Gases (3d Ed., 1950; John Wiley & Sons: New York City) by Martin Knudsen and at page 162 of Molecular Flow of Gases (1956; John Wiley & Sons: New York City) by G. N. Patterson.

It will be understood that the movement of gas molecules as above described creates a greater pressure on the hotter side than on the cooler side of the target, resulting in movement of the target toward its cooler side. Thus the importance will be appreciated of closing the space on the hotter side of the screen as much as possible. The cover plate 80 of course completely closes the major opening but, for maximum sensitivity, other openings must be restricted to the extent feasible. For this purpose the screen mesh should be very fine, as should also be the particles of smoke deposited thereon, while maintaining sufficient porosity to permit gas molecules to pass through under the influence of the effect above referred to. Similarly the peripheral clearance around the target should be minimized.

Tests have shown that helium gas produces greater sensitivity than air, carbon dioxide or nitrogen in the operation of the device, all other conditions being held constant. Depending upon the physical characteristics of the device and the gas used, maximum sensitivity may be made to occur at fairly low gas pressures, of the order of 1.0 mm. Hg, or at pressures in the neighborhood of atmospheric.

The target screen is of foraminous sheet material such as a mesh of thin filamentary members as wire or the like, either metal or non-metallic. In the presently described form of the invention, the screen is supported by the target framework illustrated primarily in order to emphasize the desirability of maintaining the peripheral clearance between target and frame as small and constant as possible while still permitting free movement of the target in response to radiation impinging thereon. The total peripheral clearance area should be no more than about five percent of the area of the screen itself for reasonably satisfactory sensitivity, and better results are obtained when the clearance area is of the order of one or two percent of the screen area.

The exposed surface of the screen should be made as nearly as possible a black body, while not interfering with passage of gas molecules through the screen. Although camphor smoke is a presently preferred material for this purpose, nevertheless it is recognized that other materials may be used so long as they meet the requirements mentioned.

Other modifications and changes from the illustrative embodiment may be made without departing from the spirit of the invention, and are intended to be embraced within the scope of the appended claims.

I claim:

1. A thermal sensing device comprising: a housing having a chamber therein; a frame within the chamber defining an opening; a target element movably mounted relative to the frame, said element including a screen having a multiplicity of openings extending therethrough and carrying black particles disposed on one face of the screen forming a porous partition pervious to molecular gas flow therethrough, the housing including a portion transparent to electromagnetic radiation whereby to permit such radiation to impinge said screen face; and cover means transparent to radiation carried by the frame for hermetically closing said opening and disposed in the path of incident radiation.

2. The invention as stated in claim 1 wherein said housing is hermetically sealed and contains substantially pure helium.

3. The invention as stated in claim 1 wherein the peripheral clearance area between the target element and frame is small relative to the screen area.

4. The invention as stated in claim 3 wherein said clearance area is less than about five percent of the screen area.

5. The invention as stated in claim 1 wherein said cover means and screen are closely adjacent when no radiation is present.

6. The invention as stated in claim 5 wherein said cover means comprises a flat plate disposed parallel to the rest position of the screen.

7. The invention as stated in claim 6 wherein the rest position of said screen is substantially vertical.

8. A device for indicating incident radiation comprising a generally flat member having a multiplicity of openings extending therethrough, the radiation-receiving face of the member being covvered by black particles, the black particles forming a porous partition pervious to molecular gas flow therethrough; and means for movably supporting said member.

9. In a device for indicating radiation incident thereon, the provision of a movable target for receiving radiation comprising a screen provided with a multiplicity of openings therethrough bearing thereon a layer of particles forming a partition porous to molecular gas flow therethrough.

References Cited in the file of this patent

UNITED STATES PATENTS

| | | |
|---|---|---|
| 454,719 | Deshler | June 23, 1891 |
| 1,183,778 | Steckel | May 16, 1916 |
| 1,730,404 | Buchanan-Wollaston | Oct. 8, 1929 |
| 1,934,375 | Reynolds et al. | Nov. 7, 1933 |
| 2,951,942 | Kramish | Sept. 6, 1960 |